United States Patent
Tester et al.

(10) Patent No.: US 7,538,726 B1
(45) Date of Patent: May 26, 2009

(54) PVT OPTIMIZATION ARCHITECTURE FOR ALWAYS-ON GPS RECEIVERS

(75) Inventors: David P. Tester, Haydon Wick Swindon (GB); Adrian P. Wise, Bracknell (GB)

(73) Assignee: Air Semiconductor, Ltd., Wiltshire (GB)

( * ) Notice: Subject to any disclaimer, the term of this patent is extended or adjusted under 35 U.S.C. 154(b) by 0 days.

(21) Appl. No.: 11/733,270

(22) Filed: Apr. 10, 2007

(51) Int. Cl.
*G01S 1/00* (2006.01)

(52) U.S. Cl. .................................. 342/357.15

(58) Field of Classification Search .................................
342/357.01–357.17
See application file for complete search history.

(56) References Cited

U.S. PATENT DOCUMENTS

| | | | | |
|---|---|---|---|---|
| 5,663,734 | A * | 9/1997 | Krasner | 342/357.12 |
| 7,148,844 | B2 * | 12/2006 | Salkhi | 342/357.12 |
| 2005/0225483 | A1 * | 10/2005 | Abraham et al. | 342/357.15 |
| 2007/0042790 | A1 | 2/2007 | Mohi et al. | 455/456.5 |
| 2007/0268180 | A1 * | 11/2007 | Zhi et al. | 342/357.12 |

* cited by examiner

*Primary Examiner*—Thomas H Tarcza
*Assistant Examiner*—Nga X Nguyen
(74) *Attorney, Agent, or Firm*—Christopher P. Maiorana, PC

(57) ABSTRACT

A method to reduce power consumption in a device is disclosed. The method generally includes the steps of (A) generating a plurality of pseudorange signals by tracking a plurality of position signals received from a plurality of satellites in a positioning system, at least one of the position signals from each one of the satellites respectively, (B) calculating both an initial position and an initial time bias from the pseudorange signals using a processing capability of the device at a normal capacity and (C) calculating both an updated position and an updated time bias using the processing capability reduced to a first capacity, wherein the first capacity (i) consumes less power than the normal capacity and (ii) is suitable to process the updated position and the updated time bias using a limited number comprising less than all of the pseudorange signals.

23 Claims, 10 Drawing Sheets

PVT OPTIMIZATION ARCHITECTURE FOR ALWAYS-ON GPS RECEIVERS

CROSS REFERENCE TO RELATED APPLICATIONS

The present application is related to co-pending U.S. patent application Ser. No. 11/613,219, filed Dec. 20, 2006, Ser. No. 11/613,280, filed Dec. 20, 2006, and Ser. No. 11/613,536, filed Dec. 20, 2006, all of which are hereby incorporated by reference in their entirety.

FIELD OF THE INVENTION

The present invention relates to a method and/or architecture for satellite positioning systems generally and, more particularly, to a Position-Velocity-Time (PVT) optimization architecture for always-on Global Position System (GPS) receivers.

BACKGROUND OF THE INVENTION

Conventional positioning systems, such as GPS receivers, are increasingly being integrated into battery operated user equipment (i.e., personal digital assistants and cellular telephones). The positioning systems calculate the locations of the user equipment based on signals received from the GPS satellites. The locations are used to provide applications and services for the benefit of the users. Owing to power consumption constraints in battery operated equipment, conventional positioning systems are normally only enabled on demand from the users.

SUMMARY OF THE INVENTION

The present invention concerns a method to reduce power consumption in a device. The method generally comprises the steps of (A) generating a plurality of pseudorange signals by tracking a plurality of position signals received from a plurality of satellites in a positioning system, at least one of the position signals from each one of the satellites respectively, (B) calculating both an initial position and an initial time bias from the pseudorange signals using a processing capability of the device at a normal capacity and (C) calculating both an updated position and an updated time bias using the processing capability reduced to a first capacity, wherein the first capacity (i) consumes less power than the normal capacity and (ii) is suitable to process the updated position and the updated time bias using a limited number comprising less than all of the pseudorange signals.

The objects, features and advantages of the present invention include providing a position-velocity-time optimization architecture for always-on global positioning system receivers that may (i) provide automatic position updates, (ii) consume minimal electrical power, (iii) appear to a user to be always operational, (iv) operate through weak and absent satellite conditions, (v) operate for periods using signals from as few as a single satellite and/or (vi) account for canyon type settings.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
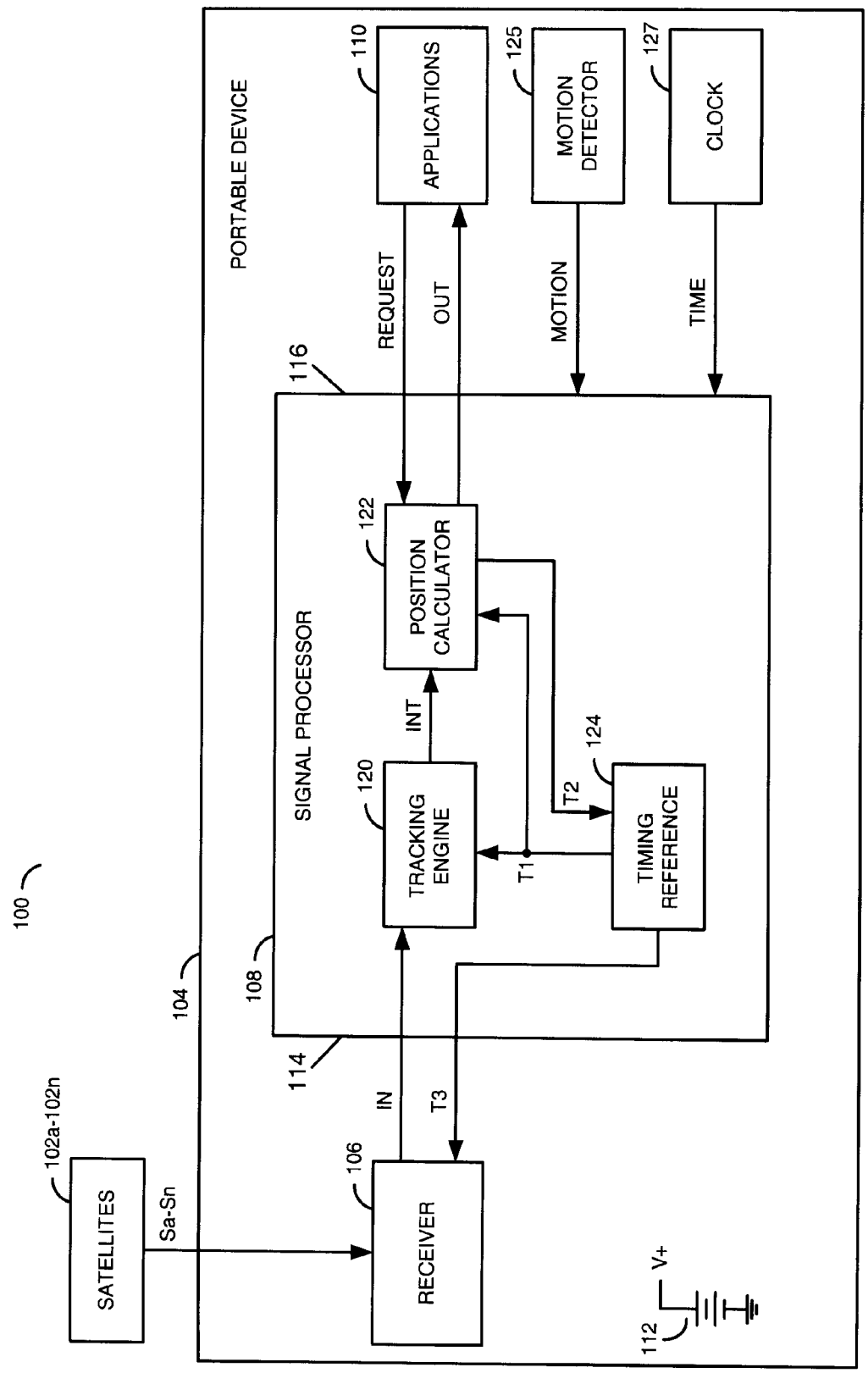
FIG. 1 is a block diagram of a system in accordance with a preferred embodiment of the present invention.

The present invention generally concerns an optimized process for determining physical coordinates from satellite pseudorange measurements in a satellite positioning receiver. The techniques may be directly applicable to all positioning technologies reliant on signal transmission time. The enhancements of the present invention may be enabled by additional information available within a positioning receiver enabled for significant periods. The techniques are particularly relevant for the optimization of always-on Global Position System (GPS) receivers.

The satellite receiver may be useful in equipment such as cell phones, personal digital assistants, laptop computers, palm computers, heads-up displays and other battery-powered and/or portable equipment. The receiver is generally designed to be powered on at all times and therefore is optimized for continuous tracking of a user's current position. As the receiver is "always on", simplifications in the architecture may be made to enable lower power consumption compared with existing techniques.

The satellite positioning receiver may determine a user location through multiple time of flight measurements from a plurality of satellites. Other position technologies based on the same techniques are possible where satellites may be replaced with other signal sources with known locations, such as cell phone base station towers. To determine a location, the receiver generally calculates a user coordinate $\{x, y, z\}$ and may also determine the relative time error (or bias) between the receiver and the positioning system infrastructure. A positioning system infrastructure typically allows N pseudorange measurements to be made from the satellites to the user receiver.

In principal the four unknown variables $\{x, y, z, t\}$ may be calculated from four pseudorange measurements (out of the N possible pseudorange measurements). However, minimization of the errors in the calculated solution generally indicates that the most appropriate four pseudorange measurements should be selected.

Selection of the most appropriate pseudorange measurements generally relies on knowledge of both the receiver position and the satellite locations. In a typical satellite positioning receiver that is not continuously aware of the user location, the selection of the best satellites may not be possible. A maximum possible number of pseudorange measurements that could be made generally form a system of M equations. The M equations may then be used to solve the four unknown variables $\{x, y, z, t\}$.

Per the present invention, the satellite positioning receiver may be continuously aware of the current user location. Therefore, the receiver may be able to determine the most appropriate satellites from which to measure pseudoranges and is generally able to minimize the positioning error through the preselection processes. The preselection process generally makes use of a figure of merit (e.g., Dilution Of Precision (DOP) metrics.)

Preselection of the appropriate satellites from which to measure the pseudoranges may allow a continuously location-aware (or always-on) positioning receiver to disable hardware and/or software associated with the measurements and/or processing of the pseudoranges for more than the minimum number (e.g., more than four) satellites. An optimized satellite positioning receiver may not include hardware and/or software for tracking more than few (e.g., 4, 5 or 6) satellites as a result.

Referring to FIG. 1, a block diagram of a system 100 is shown in accordance with a preferred embodiment of the present invention. The system (or architecture) 100 may be implemented as a satellite navigation system. The system 100 generally comprises multiple (e.g., 24 to 30) satellites 102a-102n and a device (or circuit) 104. Each of the satellites 102a-102n may generate a respective signal (e.g., Sa-Sn) receivable by the device 104. Due to the positioning of the satellites 102a-102n and various obstructions, the device 104 may receive only a subset of the signals Sa-Sn at any given time. A position, a velocity and a current time (e.g., PVT) may be calculated by the device 104 based on the received signals Sa-Sn.

In some embodiments, the satellites 102a-102n may be part of the Global Positioning System (GPS) system. In other embodiments, the satellites 102a-102n may be part of the GLObal NAvigation Satellite System (GLONASS). Other space-based positioning systems, such as the proposed Galileo project, may be used as the source of the signals Sa-Sn. Earth-based positioning systems (see FIG. 7) may be used to supplement the satellite-based systems. For example, the earth-based systems may provide a measurement of the current location by triangulation. Some embodiments may receive the position signals from any combination of two or more of the above satellite-based systems and/or Earth-based systems. For example, some of the position signals may be received from the GPS system while other position signals may be received from the GLONASS system simultaneously.

The device 104 may be implemented as a handheld (or portable) satellite receiver. The device 104 may be operational to calculate a device position, a device velocity (both magnitude and direction) and a current time using information from the signals Sa-Sn. The device 104 may be implemented as a variety of items, such as a cell phone, a personal digital assistant, a laptop computer, a GPS receiver, a heads-up display and other battery powered and/or hand-held devices.

The device 104 generally comprises a circuit (or module) 106, a circuit (or module) 108, a circuit (or module) 110, a circuit (or module) 112, an optional circuit (or module) 125 and an optional circuit (or module) 127. The signals Sa-Sn may be received by the circuit 106. An input signal (e.g., IN) may be generated by the circuit 106 and presented to the circuit 108 through an interface 114. The circuit 108 may generate a timing signal (e.g., T3) that is transferred back to the circuit 106 though the interface 114. An output signal (e.g., OUT) may be generated by the circuit 108 and presented through an interface 116 to a circuit 110. The circuit 110 may generate and present a request signal (e.g., REQUEST) to the circuit 108 through the interface 116. A signal (e.g., MOTION) may be generated by the circuit 125 and presented to the circuit 108. A signal (e.g., TIME) may also be generated by the circuit 127 and presented to the circuit 108.

The circuit 106 may be implemented as a radio front-end receiver. The circuit 106 may be operational to listen to the viewable satellites 102a-102n through the signals Sa-Sn and appropriate Earth-based transmission, if implemented. Operationally, the circuit 106 may down-convert and digitize the available signals Sa-Sn to generate the signal IN. Implementations of the circuit 106 may be in hardware, software or a combination of both hardware and software.

The circuit 108 may be implemented as a signal processor circuit. The circuit 108 is generally operational to calculate the device position and the device velocity based on the information received in the signal IN. Furthermore, the circuit 108 may maintain a current time for the device 104. Timing related information may be presented from the circuit 108 to the circuit 106 in the signal T3. Some or all of the device position, the device velocity and the current time may be presented from the circuit 108 to the circuit 110 in the signal OUT either periodically, aperiodically and/or on demand in response to a request made by assertion of the signal REQUEST. For example, an application (e.g., a cellular telephone function) in the circuit 110 may be configured to get a current location update periodically (e.g., every 20 seconds). If an update is missed for some reason, the system 100 may wait a short time (e.g., 5 seconds) and then deliver the updated location measurement.

The circuit 110 may be implemented as one or more processors executing one or more applications (e.g., software modules). The circuit 110 may be operational to utilize the device position, the device velocity and/or the current time to provide services and/or benefits to a user of the device 104. Examples of position-based services may include, but are not limited to, localized advertising, public service information, weather, traffic conditions, business hours, directions, proximity alarms, games and other applications/services that depend on the user's location. Furthermore, the circuit 110 may include a cellular telephone capability. The cellular telephone capability may receive an interrupt when a new user location has been either measured or estimated. In some embodiments, the interrupt and new user location may be used to provide a location-based personalization of the phone application (e.g., automatically adjust the ring tone based on location).

The circuit 112 may be implemented as one or more batteries. The circuit 112 generally provides electrical power to all of the other circuits. The batteries may be implemented as replaceable batteries and/or rechargeable batteries. Other power sources may be implemented to meet the criteria of a particular application.

The interface 114 may implement a receiver interface. The interface 114 generally communicates the satellite information from the circuit 106 to the circuit 108 in the signal IN. Timing information and control signals may be presented from the circuit 108 back to the circuit 106 through the interface 114.

The interface 116 may be implemented as an application interface. The interface 116 generally communicates the device position, the device velocity and the current time from the circuit 108 to the circuit 110 periodically, aperiodically and/or on demand from an external application. The demand may be passed through the interface 116 in the signal REQUEST.

The circuit 125 may be implemented as a motion detector. The module 125 may be operational to generate information in the signal MOTION by detecting a physical movement of the device 104. Example embodiments of the module 125 may include, but are not limited to, (i) one or more mercury tilt-switches, (ii) a saturated inductor responsive to changes due to motion through the Earth's magnetic field, (iii) a Micro-Electro-Mechanical (MEM) membrane on a silicon device having a capacitance that fluctuates when subjected to mechanical impulses, (iv) a piezoelectric device microphonically responsive to mechanical impulses and/or (v) other sensors that detect whether the equipment is stationary or not.

The circuit 127 may be implemented as a clock module. The module 127 may be operational to time events in the device 104 as conveyed in the signal TIME. In some embodiment, the module 127 may provide count up/count down functions.

Referring still to FIG. 1, the circuit 108 generally comprises a circuit (or module) 120, a circuit (or module) 122 and a circuit (or module) 124. The signal IN may be received by the circuit 120. An intermediate signal (e.g., INT) may be generated by the circuit 120 and presented to the circuit 122. The circuit 122 may generate the signal OUT and receive the signal REQUEST. A timing signal (e.g., T1) may be generated by the circuit 124 and presented to both the circuit 120 and the circuit 122. A timing update signal (e.g., T2) may be generated by the circuit 122 and presented to the circuit 124. The circuit 124 may also generate the signal T3.

The circuit 120 may be implemented as a tracking engine. The circuit 120 may be operational to search for the different satellites 102a-102n that may be in view of the circuit 106. Searching is generally conducted across a frequency range to compensate for Doppler frequency shifts in the signals Sa-Sn caused by the relative motion of the device 104 and the satellites 102a-102n. The searching may also be conducted in a window of time to find the correct positions of pseudo-random code sequences in the signals Sa-Sn. Conclusions from the pseudo-random code sequence searches generally give first approximations for a user time bias, reference epoch and a distance from the device 104 to respective satellites 102a-102n. The approximate distances are generally called pseudoranges.

Since the circuit 120 is always on, the circuit 120 generally has a priori knowledge of which satellites 102a-102n are in view. The circuit 120 may also have a good estimate of the satellite positions and the satellite velocities relative to the device 104. A good estimate of the resulting Doppler shifts may be calculated based on the estimated satellite positions and the estimated satellite velocities. Furthermore, the circuit 106 is generally aware of a local frequency reference that is (i) drifting relative to an absolute time (e.g., GPS time) and (ii) has an absolute frequence error. The device 104 may also generate a good estimate of the device position and the device velocity. From the device position, the device velocity and the absolute frequency error, the circuit 120 may estimate the proper positions of the pseudo-random code sequences in the signals Sa-Sn transmitted from the available satellites 102a-102n. A result is generally a reduction in the searching performed while calculating the pseudorange to each of the satellites 102a-102n and hence a corresponding reduction in the power consumed in performing the calculations.

The circuit 122 may be implemented as a position calculator. The circuit 122 generally uses the pseudoranges to the several satellites 102a-102n, information regarding the Doppler shifts, knowledge of the satellite positions and knowledge of the satellite trajectories to calculate the device position and the device velocity of the device 104. Operations within the circuit 122 may be simplified by estimating the current device position and the current device velocity from knowledge of one or more previously calculated device positions and one or more previously calculated device velocities. In turn, the simplifications may result in a reduced power consumption.

The circuit 124 may be implemented as a timing reference circuit. The circuit 124 may be used to generate a current local time in the signal T1. Corrections to the current time may be made based on satellite timing information received from the circuit 122 in the signal T2. Timing information for the circuit 106 may be generated in the signal T3.

From time to time, the signals Sa-Sn from the satellites 102a-102n may not be clearly visible from the receiver 106. For example, signal degradation or signal loss may happen when the user takes the device 104 deep inside a building. Signal loss may also happen as part of a deliberate strategy to shut down the circuit 106 for short periods to save power.

During periods of signal-loss and/or weak signals Sa-Sn, the circuit 124 generally assures that an accurate timing reference is maintained. For example, under weak signal conditions, the circuit 108 may integrate over multiple navigation bits (e.g., 20 millisecond periods) and use data wipeoff to allow coherent integration. Knowledge of how good or bad the local time base/reference frequence actually is generally provides an upper bound on the number of pseudo-random noise spreading chips to be searched in order to reacquire the GPS signals.

When the signal conditions improve and/or return to normal, the always-on circuit 120 may rapidly reacquire a new position lock by accurately knowing the elapsed time since the last position fix, the user time bias and both the absolute error and the drift error on the local frequency reference. In such a case, the new positions of the satellites 102a-102n, the Doppler shifts and the positions in the pseudo-random code sequences may be accurately estimated by the circuit 120. Afterwards, reacquisition of the satellites 102a-102n may utilize modest calculations and power.

Figure 2:
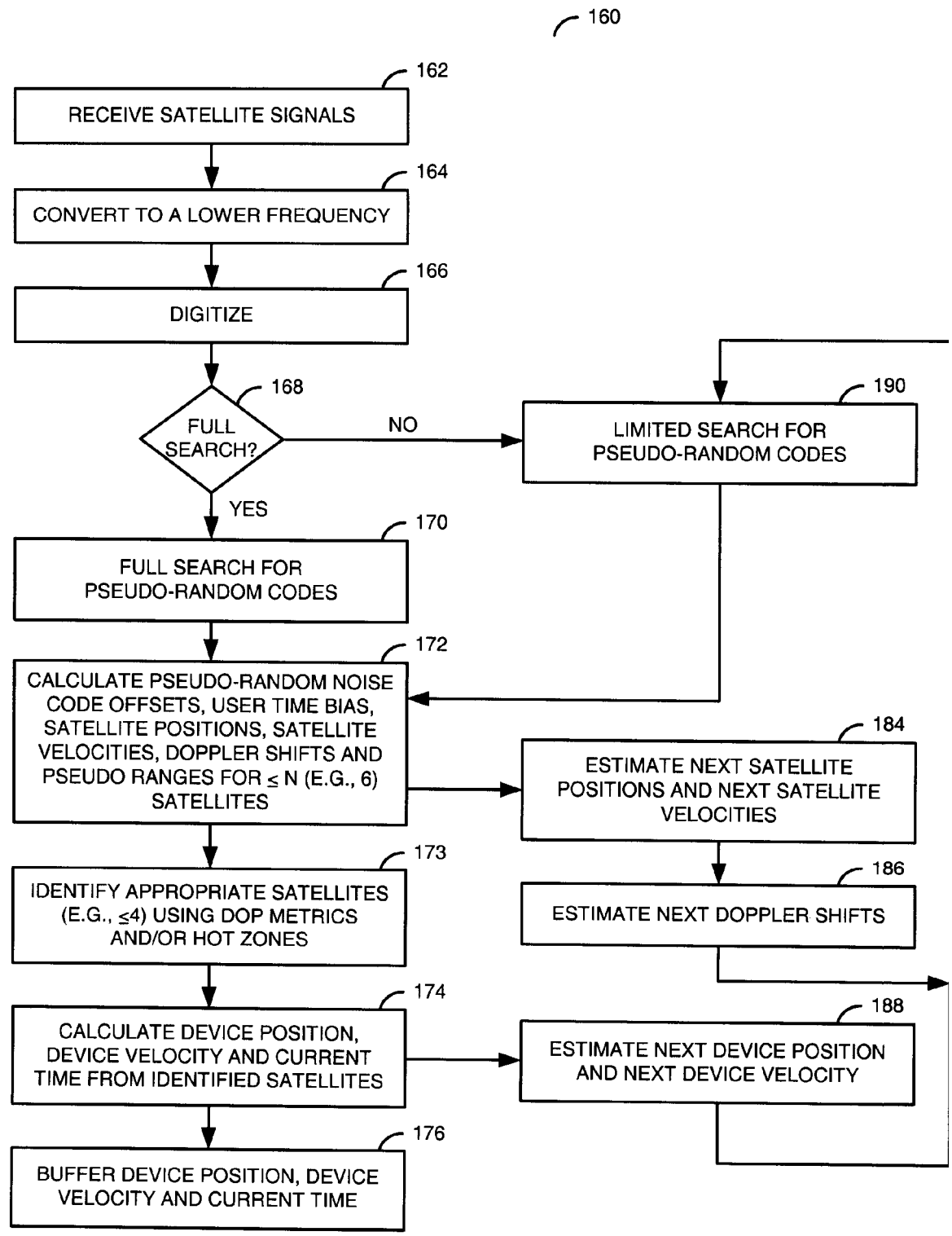
FIG. 2 is a flow diagram of an example satellite position operation.

Referring to FIG. 2, a flow diagram of an example positioning method 160 performed by the device 104 is shown. The method (or process) 160 may be implemented as a satellite positioning operation. The method 160 generally comprises a step (or block) 162, a step (or block) 164, a step (or block) 166, a step (or block) 168, a step (or block) 170, a step (or block) 172, a step (or block) 173, a step (or block) 174, a step (or block) 176, a step (or block) 184, a step (or block) 186, a step (or block) 188 and a step (or block) 190.

In the step 162, the circuit 106 may receive one or more of the signals Sa-Sn. The received signals Sa-Sn may be frequency converted to the intermediate frequency or a baseband frequency in the step 164. The resulting signal may then be digitized in the step 166 to create the signal IN.

If the signal IN contains an initial set of data from the satellites 102a-102n, a full search for the pseudo-random codes may be performed by the circuit 120 (e.g., the YES branch of the step 168). In the step 170, the circuit 120 may search in both frequency and in time for the pseudo-random codes received in the signal IN. The search may be limited to the strongest signals. Satellites 102a-102n known to be well below the horizon may be eliminated from the search.

Once the pseudo-random codes have been identified, a correlation peak from a prompting correlator may be examined to estimate the signal energy. If a sub-chip time offset exists in the locally generated pseudo-random noise code, a local reference frequency error (e.g., due to a Doppler shift) may be corrected. The circuit 120 may then calculate the satellite positions, the satellite velocities and the Doppler shift information in the step 172. The pseudoranges and associated Doppler shift information may be presented to the circuit 122 in the signal INT. To conserve power, the calculations may be (i) limited to a restricted number of satellites 102a-102n (e.g., at most six satellites), (ii) performed periodically (e.g., once every 15 second to 30 seconds), (iii) performed aperiodically and/or (iv) performed on demand.

In the step 173, the circuit 122 may identify a group of appropriate satellites 102a-102n for subsequent use in calculating the device position. The group generally comprises a restricted number (e.g., four or less) of satellites 102a-102n. Generally, the circuit 122 may calculate a figure of merit (e.g., a Geometric Dilution Of Precision (GDOP)) for all of the satellites 102a-120n that may be visible. A combination of the satellites 102a-102n that gives a best figure of merit (e.g., a smallest dilution of precision metric) may be used by the circuit 122. In contrast, a typical position-velocity calculation takes into account 6 to 12 of the satellites 102a-102n.

Other figures of merit (or metrics) may be used to determine which of the visible satellites 102a-102n and/or various received signals may form the appropriate group. In some embodiments, the group may be selected to include the strongest signals Sa-Sn (e.g., highest received power) arriving at the circuit 106. Other embodiments may take into account signals received from one or more of a Wide Area Augmentation System (WAAS), a Local Area Augmentations System (LAAS) and/or a Differential GPS (DGPS) system. In still other embodiments, signals on other frequencies (e.g., an L2C frequency of the GPS satellites) are generally useful in correcting for atmospheric effects. Therefore, the position signals at several different frequencies may be considered when determining the group.

Figure 7:
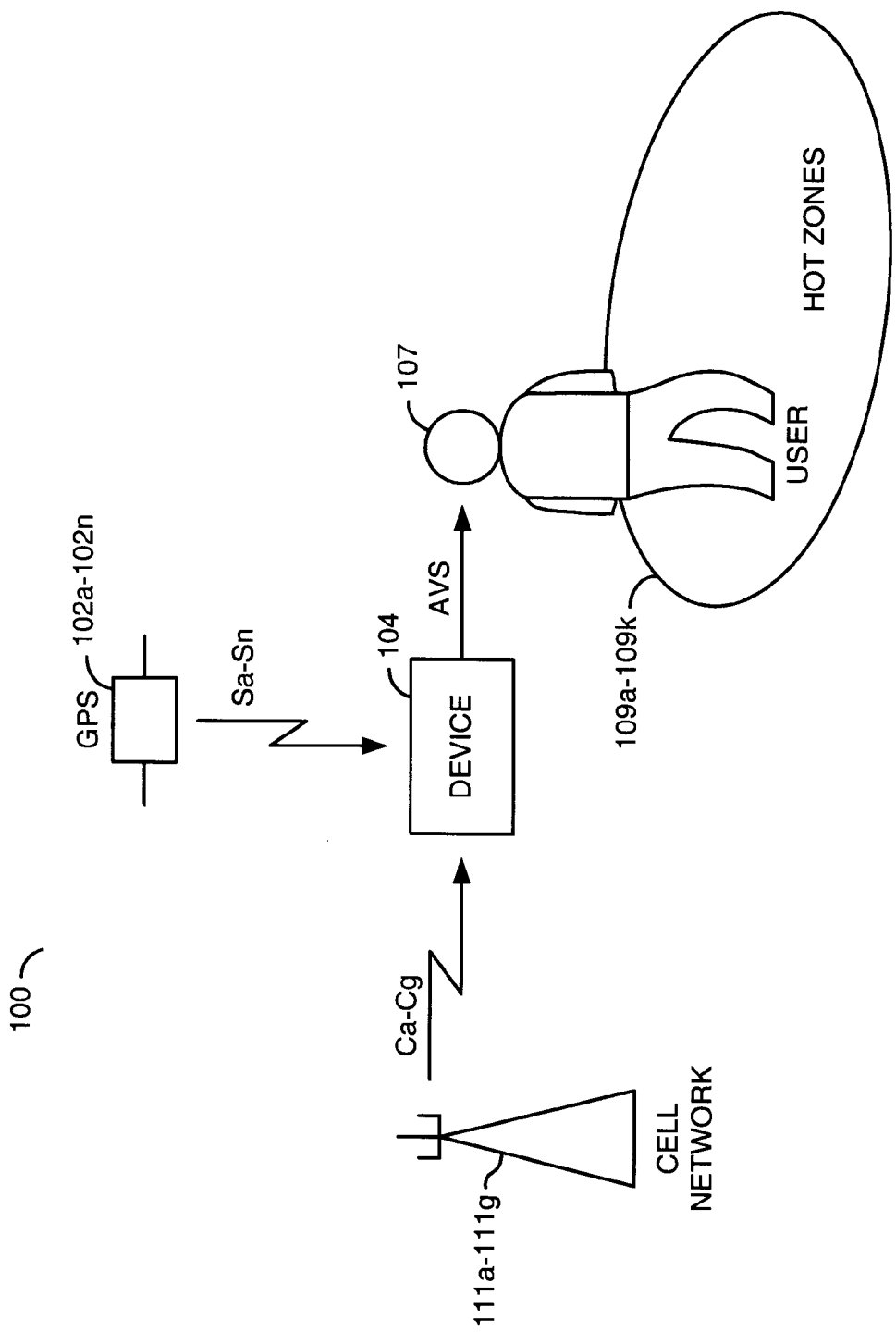
FIG. 7 is a diagram of the system with hot zones.

Visibility of the satellites 102a-102n may be governed by "hot zones" (see FIG. 7). The hot zones may provide information about the availability of the satellites 102a-102n due to nearby obstructions, such as tall buildings, hills and mountains. As such, satellites 102a-102n hidden by the obstructions may be eliminated from the figure of merit calculations.

In the step 174, the circuit 122 may calculate the position of the device 104, the velocity of the device 104 and a "GPS time" (e.g., 14 seconds different from Universal Time as of 2006) using the data from the identified satellites 102a-102n. The user time bias from the GPS time may be presented to the circuit 124 in the signal T2. The calculations are generally based on the pseudoranges and the Doppler shift information received in the signal INT. The current time may also be available to the circuit 122 via the signal T1. Once calculated, the device position, the device velocity and the current time may be buffered by the circuit 122 in the step 176.

During subsequent sets of searches and calculations for the signal IN, the circuit 108 may use prior knowledge of the satellite positions, the satellite velocities, the device position, the device velocity and the current time to simplify the workload. In the step 184, the circuit 120 may estimate the next satellite positions and the next satellite velocities. Afterwards, the circuit 120 may estimate the next expected Doppler shifts of the satellites 102a-102n in the step 186. The satellite estimates may be performed independently of any hot zone definitions. (An obstructed satellite 102a-102n may be visible at the next measurement.) Likewise, the circuit 122 may calculate a next device position and a next device velocity in the step 188. A combination of the estimated satellite positions, satellite velocities, Doppler shifts, device position and device velocity may be used in the circuit 120 to perform a limited search of the next set of pseudo-random codes in the step 190. Once the pseudo-random codes have been found, the circuit 120 may continue calculating the actual satellite positions, the actual satellite velocities and the actual Doppler shift information as before in the step 176.

A pseudorange error (e.g., $\Delta\rho$) calculated by the circuit 108 as a function of a user position error (e.g., $\Delta x$) may be expressed in matrix form in equation 1 as follows:

$$\Delta\rho = H\Delta x \quad \text{Eq. (1)}$$

where $$\Delta\rho = \begin{bmatrix} \Delta\rho_1 \\ \Delta\rho_2 \\ \Delta\rho_3 \\ \Delta\rho_4 \end{bmatrix}, H = \begin{bmatrix} a_{x1} & a_{y1} & a_{z1} & 1 \\ a_{x2} & a_{y2} & a_{z2} & 1 \\ a_{x3} & a_{y3} & a_{z3} & 1 \\ a_{x4} & a_{y4} & a_{z4} & 1 \end{bmatrix}, \Delta x = \begin{bmatrix} \Delta x_u \\ \Delta y_u \\ \Delta z_u \\ -ct_u \end{bmatrix}$$

and $a_{xj}$, $a_{yj}$ and $a_{zj}$ generally represent direction cosines of a unit vector from the approximate user position to the jth satellite. The direction cosines may be expressed in equations 2-4 as follows:

$$a_{xj} = \frac{X_j - x_u}{r_j} \quad \text{Eq. (2)}$$

$$a_{yj} = \frac{Y_j - y_u}{r_j} \quad \text{Eq. (3)}$$

$$a_{zj} = \frac{Z_j - z_u}{r_j} \quad \text{Eq. (4)}$$

where $X_j$, $Y_j$ and $Z_j$ may represent the jth satellite position, $x_u$, $y_u$ and $z_u$ may represent the estimated user position, and $r_j$ may be an estimated range from the estimated user position to the jth satellite. Solving equation 1 for $\Delta x$ generally results in equation 5 as follows:

$$\Delta x = (H^T H)^{-1} H^T \Delta\rho \quad \text{Eq. (5)}$$

A solution of the resulting set of four equations associated with four pseudorange measurements may be optimal since the resulting matrix math may exploit a relationship that $H^T H = I$, where $H^T$ is a transpose of the matrix H and I is the identity matrix. By tracking four satellites, then $(H^T H)^{-1} = H^{-1}(H^T)^{-1}$ and equation 5 reduces to equation 6 as follows:

$$\Delta x = H^{-1} \Delta\rho \quad \text{Eq. (6)}$$

As such, the circuit 122 may avoid consuming power to calculate $(H^T H)^{-1}$. Use of the optimized four pseudorange situations generally allows the user location to be determined through solution of a set of four unknowns in four equations, resulting in a further hardware and performance optimization due to the reduced computation criteria.

Figure 3:
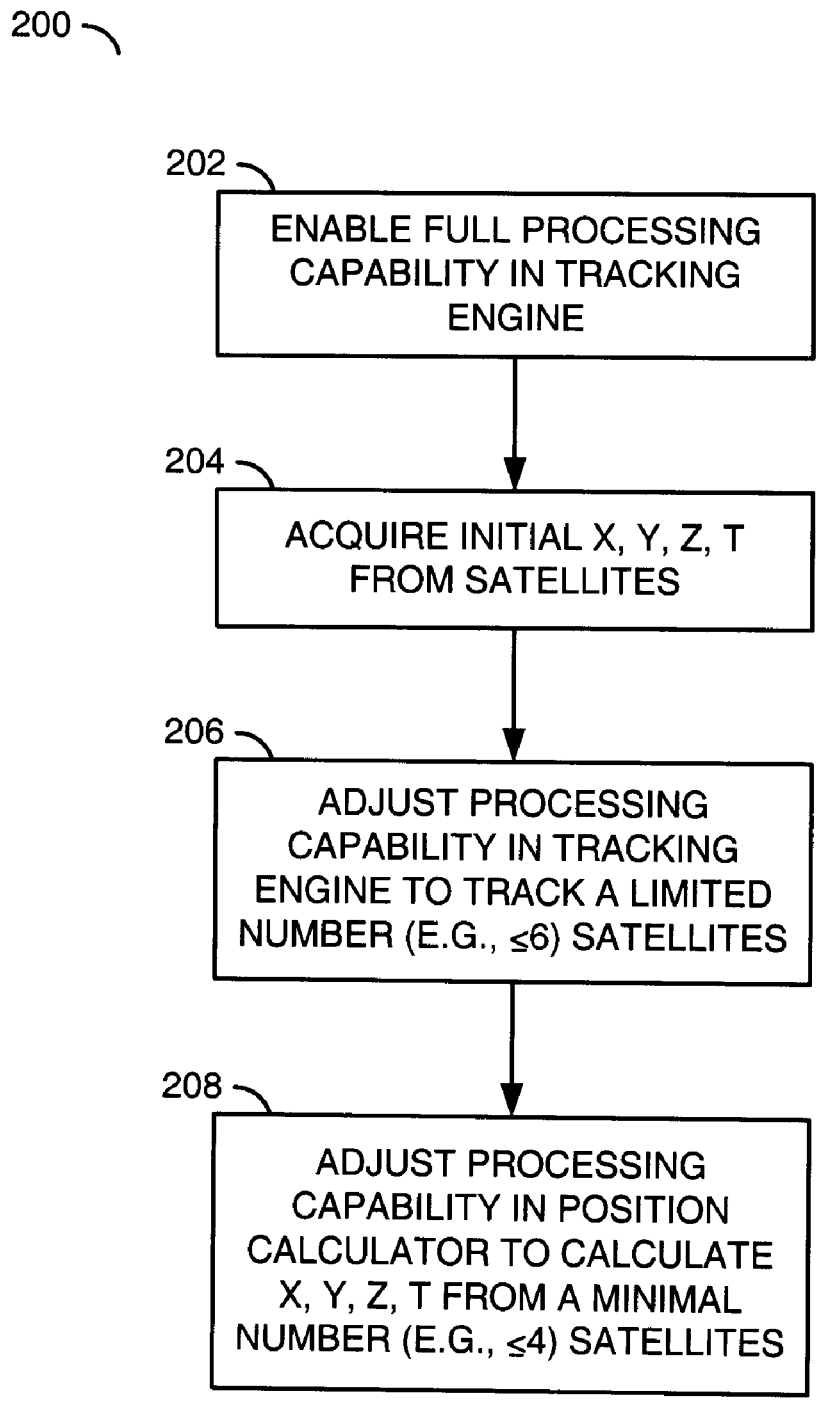
FIG. 3 is a flow diagram of an example method of adjusting processing capabilities.

Referring to FIG. 3, a flow diagram of an example method 200 of adjusting processing capabilities is shown. The method (or process) 200 generally comprises a step (or block) 202, a step (or block) 204, a step (or block) 206 and a step (or block) 208.

In the step 202, the device 104 may enable full processing capabilities in the circuit 120, the circuit 122 and the circuit 124. The circuit 120 and the circuit 122 may calculate an initial position {x,y,z} from the satellites 102a-102n in the step 204 and update the current local time t in the circuit 124. Afterwards, the processing capabilities in the circuit 120 may be reduced in the step 206 to reduce power consumption. Operating under the reduced conditions, the circuit 120 may continue to track a limited number (e.g., $\geq 6$) of the satellites 102a-102n.

In the step 208, the processing capabilities in the circuit 122 may be reduced to conserve more power. By considering the data from a minimal number (e.g., ≧4) of satellites 102a-102n, the circuit 122 may calculate one or more new values for the position variable (or coordinate) x, the position variable (or coordinate) y, the position variable (or coordinate) z and/or the local time variable t. Reduction of the processing capabilities may be accomplished by powering down hardware and/or changing software execution to run less complicated (e.g., fewer calculations) software modules.

Figure 4:
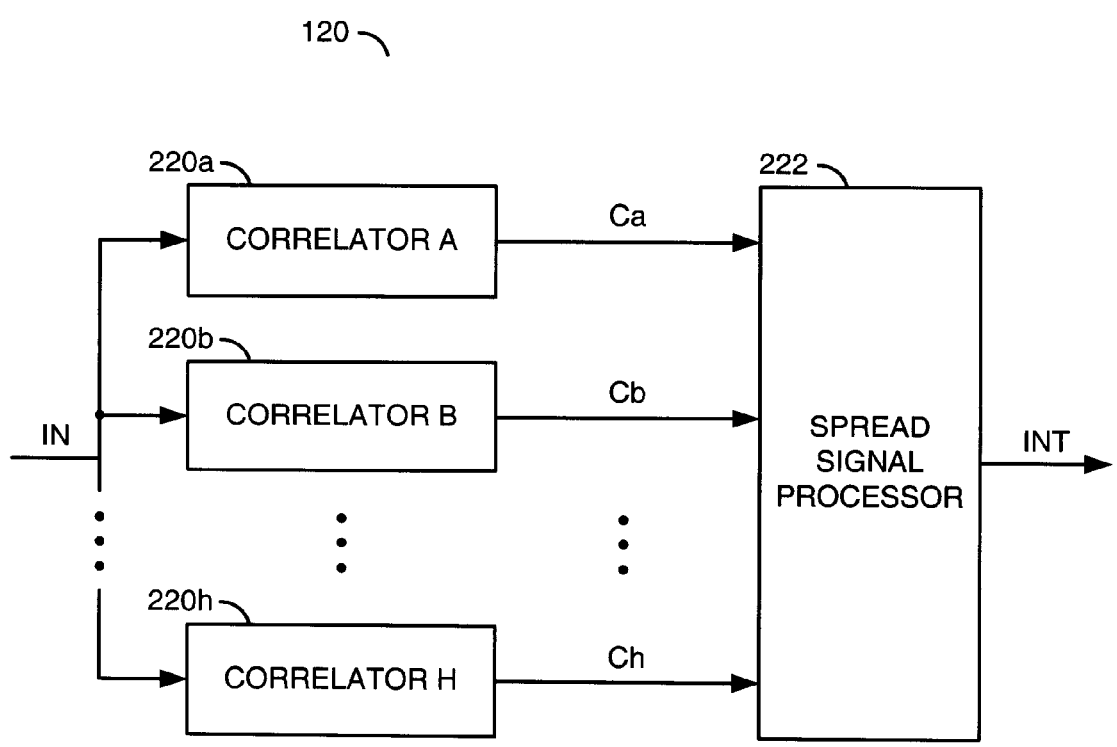
FIG. 4 is a detailed block diagram of an example implementation of a tracking engine.

Referring to FIG. 4, a detailed block diagram of an example implementation of the circuit 120 is shown. The circuit 120 generally comprises multiple circuits (or modules) 220a-220n and a circuit (or module) 222. Each of the circuits 220a-220n may receive the signal IN. The circuit 222 may generate the signal INT. Each of the circuits 220a-220h may generate a respective signal (e.g., Ca-Ch) that is presented to the circuit 222.

Each of the circuits 220a-220h may be implemented as a correlator. The circuits 220a-220h generally compare the patterns received in the signal IN to locally generated versions of the pseudo-random codes. A correlation value is generated based on each comparison and presented in a respective signal Ca-Ch. A high correlation value generally indicates that the circuit 220a-220h has found a good match between a locally generated pseudo-random code and a unique pseudo-random code from one of the satellites 102a-102n. To conserve power, a finite number (e.g., 6 to 50) of the circuits 220a-220h may be implemented. In some embodiments, as few as 6-10 of the circuits 220a-220h may be employed in a design. To conserve power further, the supply voltages to one or more of the circuits 220a-220h may be switched off when the device 104 is tracking just a few satellites 102a-102n (e.g., smaller search space).

The circuit 222 may be implemented as a spread signal processor. The circuit 222 is generally operational to process the signals Ca-Ch. The processing generally includes, but is not limited to, controlling the search for the pseudo-random codes, identifying when a pseudo-random code has been found, identifying the particular satellite 102a-102n for each pseudo-random code found, calculating the pseudorange to the satellites 102a-102n, calculating the velocity of the satellites 102a-102n and calculating Doppler shift information for the satellites 102a-102n.

In a positioning receiver that is continuously aware of the user location, the previous user position and current time bias are always known. Location is calculated at a predefined (but potentially variable) update rate and an error exists between the last calculated position and the current position. The local time bias is also subject to an error due to drift between the receiver time base and the satellite system time base (e.g., GPS time).

If the position update rate is frequent, a local time bias error term may be considered small. In such a situation, the general four unknown variables {x, y, z, t} may be reduced to three unknown variables {x, y, z} and the known time t. As such, the continuously location-aware positioning device 104 may solve a system of three equations to determine the three unknowns. By switching off (or reducing) power to hardware and/or changing the software modules being executed, solving of the three unknowns with three equations may result in a 25% optimization over a case solving four unknowns with four equations.

Figure 5:
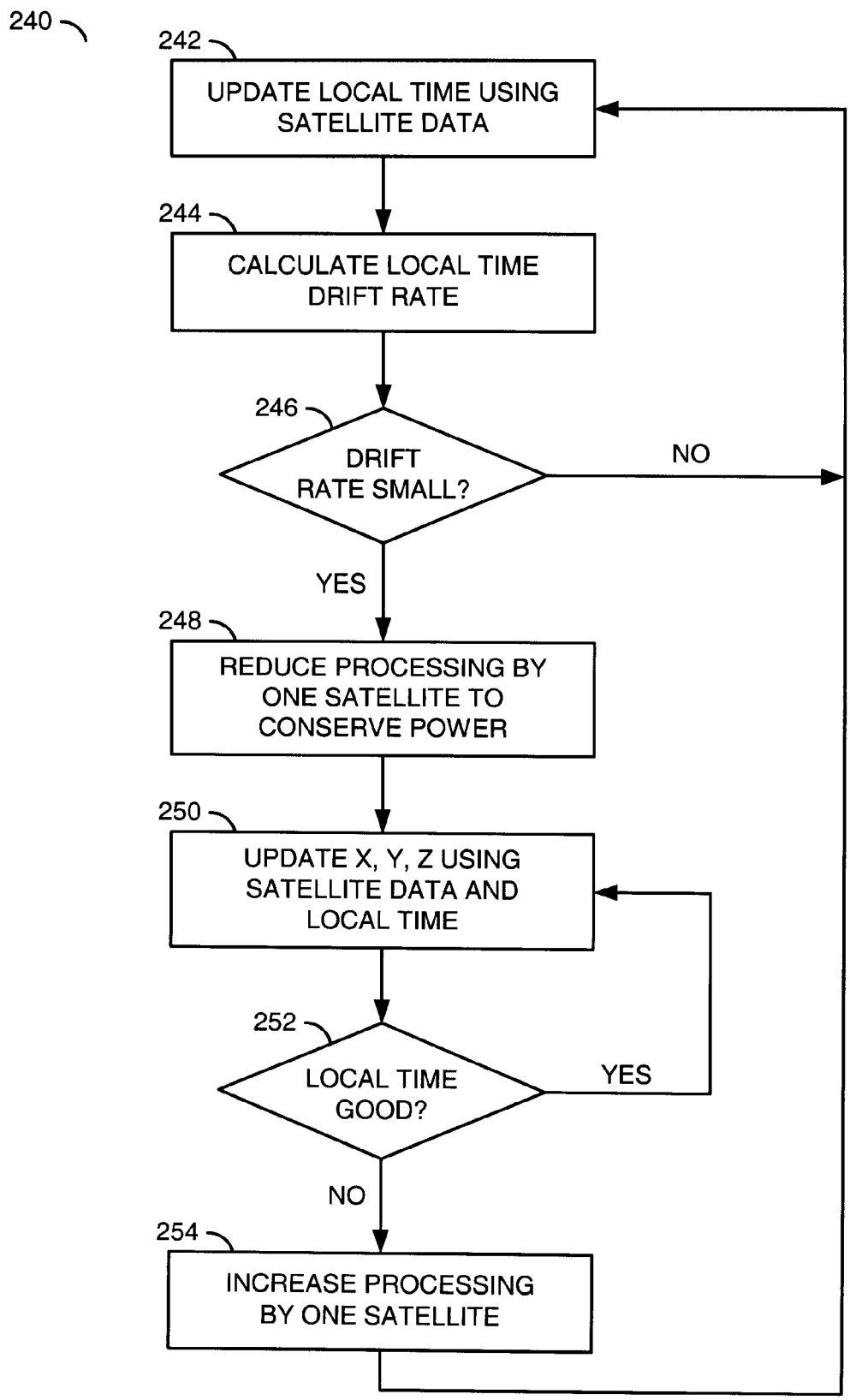
FIG. 5 is a flow diagram of an example method of position reporting based on three satellites.

Referring to FIG. 5, a flow diagram of an example method 240 of position reporting based on three satellites is shown. The method (or process) 240 may report the location {x,y,z} based on the satellite data and report a current time based on the timing reference. The method 240 generally comprises a step (or block) 242, a step (or block) 244, a step (or block) 246, a step (or block) 248, a step (or block) 250, a step (or block) 252 and a step (or block) 254.

In the step 242, the device 104 may be operating from a normal number of satellites 102a-102n to update the local time t to match the GPS time. The circuit 122 may monitor the updates for a while to determine a drift rate of the local time t in the step 244. If the drift rate is not small (e.g., the NO branch of step 246), the device 104 may continue to rely on the satellite data used in the step 242 to maintain the local time t synchronized to the GPS time.

If the drift of the local time t is negligible (e.g., the YES branch of the step 246), the processing capability of the circuit 122 may be reduced from a normal capacity to a reduced capacity by at least one satellite to conserve power. The circuit 120 may thus operate with three equations to solve three unknowns (e.g., x, y and z) with the time variable t being known internally. The processing capability of the circuit 122 may be reduced by a single satellite to a reduced capacity in the step 248 to reduce the power consumption. In the step 250, the circuit 122 may update and report a next measured location using newly received pseudoranges. The local time kept by the circuit 124 may be reported as the current time.

A check of the drifting local time t may be made by the circuit 122 to determine if the local time t is still good. The check may be performed periodically, aperiodically and/or in response to detecting movement of the device 104. For example, the local time t may be considered valid with the measured drift rate multiplied by the period since the last time measurement is less than a programmable threshold. In another example, the local time t may be considered good for a fixed period (e.g., 10 seconds, 1 minute, 5 minutes, etc.) as counted by the circuit 127. Assertion of the signal MOTION by the circuit 125 may be a triggering event that signals an end to the validity of the local time t. Furthermore, a measured position error in one or more of the measured position variables x, y and/or z compared with the estimated position variables may suggest that the local time t should be updated from the satellites 102a-102n. While the local time t is considered valid (e.g., the YES branch of step 252), the circuit 122 may continue to update the position variables x, y and z in the step 250 based on data from the reduced number of satellites 102a-102n.

When the local time t is no longer considered good (e.g., the NO branch of step 252), the processing capability of the circuit 122 may be increased from the reduced capacity back to the normal capacity (or some other higher capacity) to account for one or more additional satellites 102a-102n in the step 254. The increased number of satellites 102a-102n generally enables the circuit 122 to consider a sufficient number (e.g., ≧4) of satellites 102a-102n to calculate the GPS time from the satellite data. The calculated GPS time may then again be used to correct the drifting local time t in the step 242.

In some cases, one or more of the position coordinates x, y, and/or z may be predicted with sufficient accuracy to be considered a known value. For example, the z position coordinate may be considered a constant value when the device 104 is moving along level ground. If one position variable is known, the set of parameters {x, y, z, t} may be solved through the solution of three equations and three unknowns.

Figure 6:
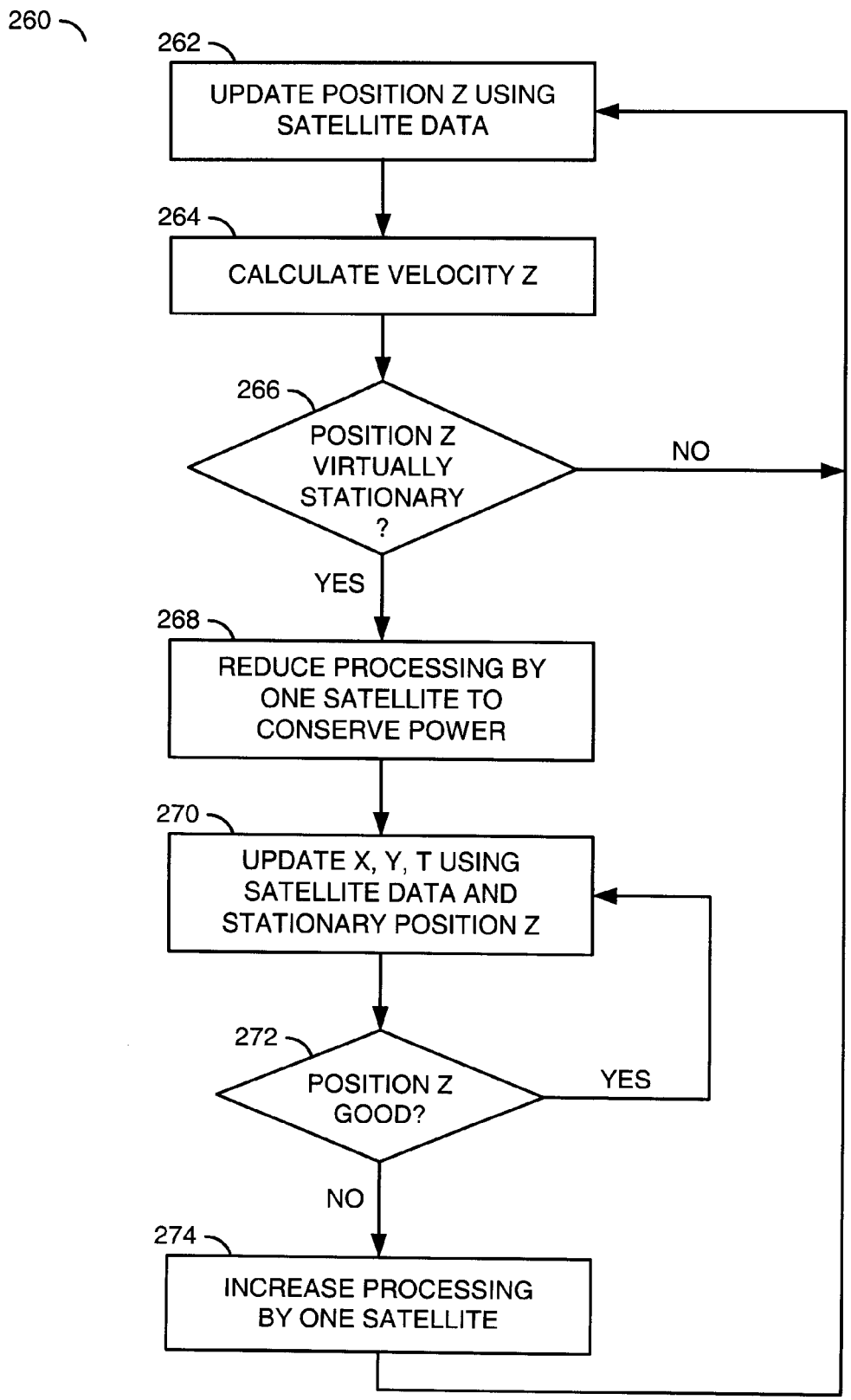
FIG. 6 is a flow diagram of an example method of position and time reporting with fewer than four satellites.

Referring to FIG. 6, a flow diagram of an example method 260 of position and time reporting with fewer than four satellites is shown. The method (or process) 260 may report less than all of the position variables x, y and z and the time t based on the satellite data. The method 260 generally comprises a step (or block) 262, a step (or block) 264, a step (or block) 266, a step (or block) 268, a step (or block) 270, a step (or block) 272 and a step (or block) 274.

In the step 262, the circuit 122 may calculate the position z of the device 104 from the data received from the normal number of satellites 102a-102n. The circuit 122 may compare the newly measured position z to one or more previous positions z to calculate a velocity in the z direction in the step 264. If the device 104 has appreciable motion in the z direction (e.g., the NO branch of step 266), the circuit 122 may continue to report the position z as calculated using the satellite data per the step 262.

If the device 104 is found to be stationary or moving slowly (e.g., a negligible rate) along the z axis (e.g., the YES branch of step 266), the circuit 122 may conclude that the position z has an essentially constant value. Therefore, the circuit 122 may operate with three equations to solve three unknowns (e.g., x, y and t) with the position z being known internally. The processing capability of the circuit 122 may be reduced by at least one satellite in the step 268 to reduce the power consumption. In the step 270, the circuit 122 may update and report a next measured location and time using the newly received satellite data. The stationary value may be reported for the position z.

As long as the position z remains valid (e.g., the YES branch of step 272), the circuit 122 may continue to update and report the position x, the position y and the time t based on the reduced amount of satellite data per the step 270. The definition of a good position z may be similar to that of a good local time t. For example, the position z may be considered valid for a fixed period (e.g., 10 seconds, 1 minute, 5 minutes, etc.). The position z may also be considered good while the signal MOTION remains deasserted by the circuit 125. A measured position error in one or more of the measured position coordinates x, y and/or z compared with the estimated positions may suggest that the position coordinate z should be updated from the satellites 102a-102n.

Once the position z is determined to be invalid (e.g., the NO branch of step 270), the processing capability of the circuit 122 may be increased by one satellite in the step 272. Using the additional satellite signals, the circuit 122 may calculate a new position z in the step 262.

Methods similar to the method 260 may be implemented by the device 104 for cases where the position x is considered stationary and cases where the position y is considered stationary. Decision when to deduce and increase the number of satellites used to calculate stationary positions and/or a reasonably accurate local time t may be made independent of each other. As such, the number of satellites 102a-102n considered by the circuit 122 may be reduced from four (four unknowns in four equations) to three satellites, two satellites and in some cases a single satellite.

Under restricted circumstances, the local time t may be known and the user positions variables x and y may be considered virtually stationary while the vertical position z may be moving. For example, a device 104 in a lift elevator of a tall building may have insignificant x and y movement with considerable change in elevation (z direction). In the above situation the set {x, y, z, t} may be resolved for a single unknown (e.g., z) in a single equation using a single pseudorange measurement.

Operation of the device 104 may be further optimized to reduce key metrics, such as power consumption, by exploiting the probability that the device 104 may remain stationary for statistically significant periods. In some circumstances, the unknown term may be the local time t while the physical location {x,y,z} may be known. For example, the device 104 may be set down at a fixed location for an extended period. As such, only the unknown local time t may be measured using the last known user location {x,y,z} and a single pseudorange measurement. Example situations of a device 104 embedded in a cell phone remaining stationary may include, but are not limited to, during a meeting at the office, during a typical work day when the cell phone is on a desk and overnight when the cell phone is plugged into a charger. Detection of a lack of movement may be used to infer position. If the last known position is available and either (i) no movement or (ii) insignificant movement of the device 104 has been detected since the last position measurement, the current location may be inferred to be the same as the last location. An assertion of the signal MOTION by the circuit 125 may be a good indication that the device 104 is no longer stationary. A time of day (e.g., 7:00 am) may also be used as an indication that the user is about to wake up and move the device 104.

Movement of the stationary device 104 may also be determined from the satellite data. Measurements of pseudoranges from a restricted number of satellites (e.g., 102a and 102b) may be compared to previously measured pseudoranges from the same satellites to determine a change in distance from the device 104 to the restricted number of satellites. The measured pseudoranges may be adjusted to account for the change in location of the low earth orbit (and hence moving) satellites 102a-102n. Potentially, a distance change may be detected with as few as one pseudorange measurement. Such a capability may be beneficial in an indoor environment where multiple satellite signals are generally not available. The single satellite measurement may also be useful in weak signal environments.

Another mechanism for detecting movement may be achieved by calculating a range to one or more geostationary satellites. For example, a geostationary Wide Area Augmentation System (WAAS) satellite, a European Geostationary Navigation Overlay Service (EGNOS) satellite and/or a similar geostationary satellite may be used to measure a pseudorange instead of the GPS satellites, the GLONASS satellites or the Galileo satellites.

Because the device 104 is continuously aware of the current position, the device 104 may be able to make adaptive decisions on which satellites 102a-102n to search for and track based on internally known information on both current and previous positions, velocities and accelerations. Furthermore, the device 104 may be aware of the surroundings that may impact the pseudorange measurements.

A satellite positioning receiver generally depends on clear lines-of-sight from an antenna to the satellites 102a-102n to make the pseudorange measurements. In an urban canyon environment, clear lines-of-sight are often an issue. Depending on the current location, the device 104 generally has a restricted view of the sky. When the device 104 has a restricted view of the sky, the number and the position of the visible satellites 102a-102n may be limited. Furthermore, the visible satellites 102a-102n are often located in the same region of the sky. Close spatial groupings of the satellites 102a-102n generally increases the error present in the location calculations and may result in a lower accuracy for the reported position.

An always-on or continuously location-aware device 104 may include hot zone mapping information describing the urban (or natural) canyon. The mapping generally provides the device 104 with key locations where enhanced visibility of the sky should be available. The device 104 may use the hot zone information to detect proximity to improved visibility locations. As the device 104 enters (or passes through) the region of improved visibility to the sky, the device 104 may determine an estimated length of time available to measure pseudoranges to some or all of the satellites 102a-102n that will come into clear view, lock to the available signals Sa-Sn, and measure the pseudoranges to the visible satellites 102a-102n. For example, a user carrying a cell phone with the device 104 embedded within may be walking through a city between tall buildings. As the user crosses intersections on the roads in the city, differing views of the sky may become available. If the user enters a park, a wider view of the sky may open allowing the device 104 to utilize more satellites 102a-102n for a limited time. The device 104 may take advantage of the improved view of the sky to measure the pseudoranges to a greater number and greater spatial distribution of satellites 102a-102n, resulting in an improved DOP and thus an improved accuracy in the measurements.

Referring to FIG. 7, a diagram of the system 100 with hot zones is shown. The system 100 generally comprises the multiple navigation satellites 102a-102n and the device 104 as noted before. The system 100 may further include a user 107, one or more hot zones 109a-109k and one or more optional cellular network towers 111a-111g. Multiple signals (e.g., Ca-Cg) may be transmitted from the cellular network towers 111a-111g to the device 104. A signal (e.g., AVS) may be generated and presented from the device 104 to the user 107 based on one or more zones 109a-109k where the device 104 is currently located. The signal AVS generally comprises one or more audio signals, one or more visual signals and/or one or more tactile signals (e.g., vibrations) perceivable by the user 107.

In some embodiments, space-based and/or ground-based transmitters may also be used to increase the position measuring performance. For example, the Wide Area Augmentation System (WAAS), the European Geostationary Navigation Overlay Service (EGNOS), the Multi-Functional Satellite Augmentation System (MSAS) and/or the Differential Global Positioning System (DGPS) may be used to generate and/or augment the signals Sa-Sn and/or the signals Ca-Cg.

Each of the hot zones 109a-109k may be defined in two or more spatial dimensions and optionally in a time dimension. The hot zones may or may not overlap each other in time and/or space in various situations. Each of the hot zones 109a-109k generally defines one or more applications, one or more services available to the user 107 and/or one or more spatial restrictions.

The cellular network towers 111a-111g may be operational to provide cellular telephone services to the device 104. In some cases, the cellular network towers 111a-111g may also provide data services to the device 104. For example, each of the cellular network towers 111a-111g may transmit the definitions of the hot zones 109a-109k in and around a local cellular coverage area to the device 104. In other cases, the cellular network towers 111a-111g may act as references from which the device 104 may triangulate a current location.

Figure 8:
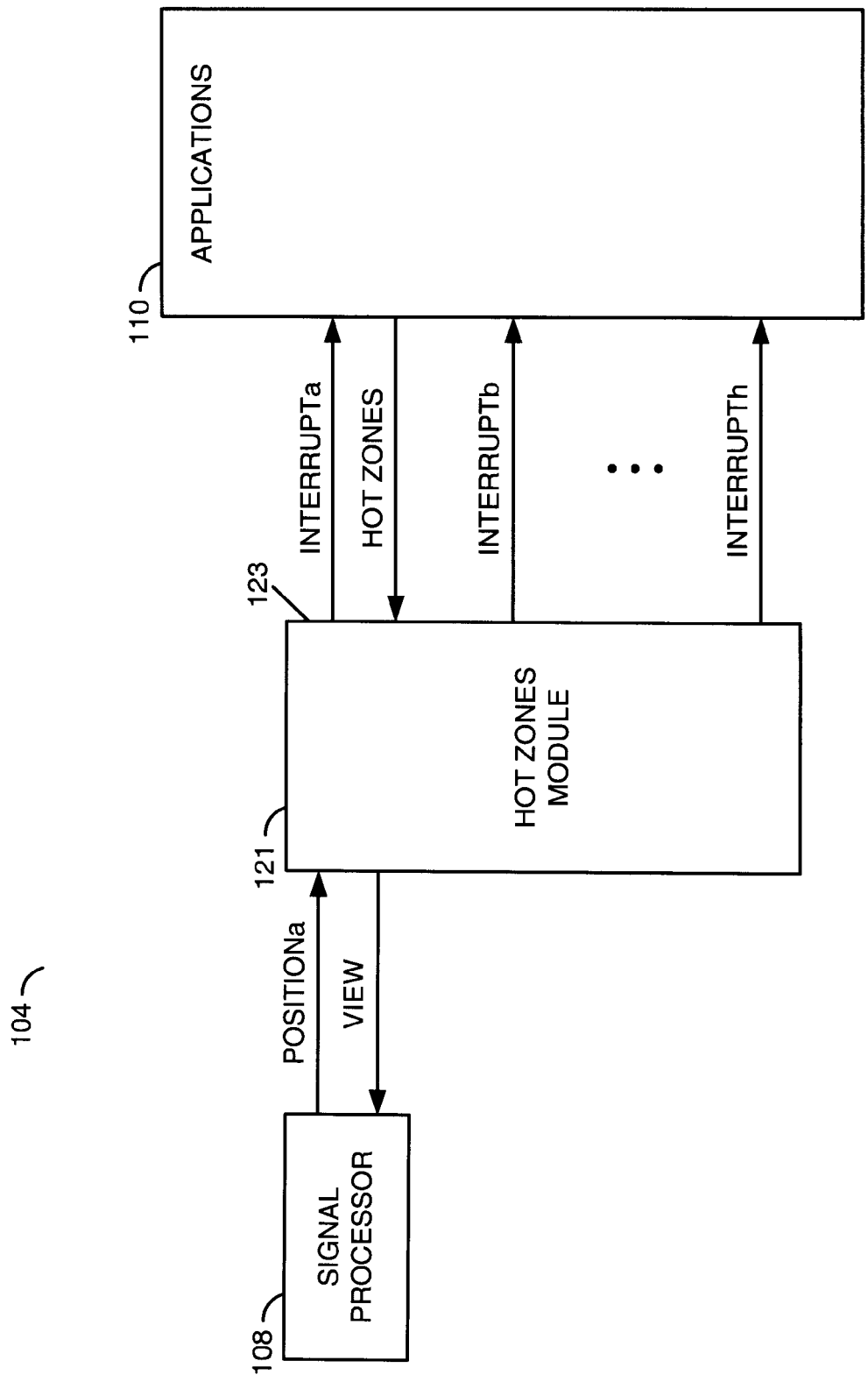
FIG. 8 is a partial block diagram of an example implementation of a positioning receiver.

Referring to FIG. 8, a partial block diagram of an example implementation of the device 104 is shown. The device 104 may include an optional module (or circuit) 121 functionally located between the circuit 108 and the circuit 110. The signal OUT may be presented from the circuit 108 to the module 121. A signal (e.g., VIEW) may be generated by the module 121 and presented to the circuit 108. The module 121 may generate and present one or more signals (e.g., INTERRUPTa-INTERRUPTh) through an interface 123 to the circuit 110. The circuit 110 may generate and present a signal (e.g., HOT ZONES) back to the module 121 through the interface 123.

The module 121 may be implemented as a hot zones module. The module 121 may be operational to generate the signals INTERRUPTa-INTERRUPTh and the signal VIEW based on (i) the hot zone definitions received in the signal HOT ZONES and (ii) a current position in the signal OUT. The module 121 may be created in hardware and/or software executing on a processor within the device 104. The module 121 may be (i) part of the circuit 108 and/or the circuit 110 or (ii) a separate circuit standing alone. A partitioning decision may be made according to whichever arrangement yields the lowest overall system power consumption.

Figure 9:
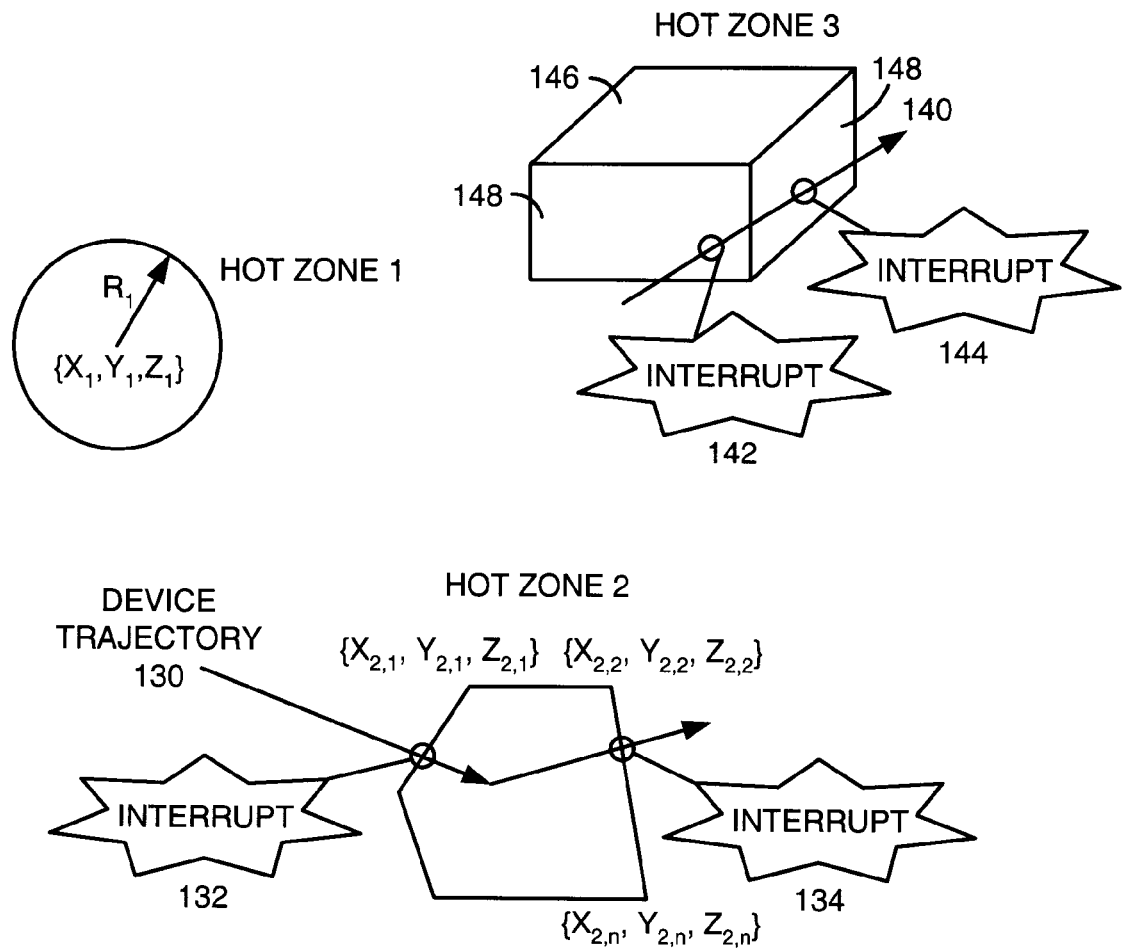
FIG. 9 is a diagram illustrating several example hot zones.

Referring to FIG. 9, a diagram illustrating several example hot zones 109a-109k is shown. The hot zones 109a-109k may be either areas on the surface of the Earth (e.g., defined in two spatial dimensions) or volumes defined in space (e.g., defined in three spatial dimensions). Some, none or all of the hot zones 109a-109k may change as a function of time. The circuit 110 generally defines the hot zones 109a-109k according to the specifications of one or more applications and/or one or more services running therein. The circuit 110 may update the hot zone definitions at anytime to create new hot zones, modify existing hot zones and/or delete hot zones. Generally, the hot zones 109a-109k may be separated in space and/or time, overlapping or completely enclosed by other hot zones 109a-109k.

Three techniques for defining hot zones 109a-109k are illustrated in FIG. 9. A first hot zone (e.g., hot zone 1) may be defined by the coordinates of a point (e.g., $\{X1, Y1, Z1\}$) and a radius (e.g., R1) around the point. If the point $\{X1, Y1, Z1\}$ is specified in two spatial dimensions, the hot zone 1 may represent a circle with radius R1 on the surface of the Earth. Alternatively, the point $\{X1, Y1, Z1\}$ may be specified in three spatial dimensions. Therefore, the hot zone 1 may represent a sphere, also with radius R1, that may be at any altitude above the surface of the Earth (for example, on the upper floors of a building).

A second hot zone (e.g., hot zone 2) is generally defined as a set of coordinates representing (i) the vertices of a polygon in two dimensions or (ii) the vertices of a polyhedron in three dimensions. The hot zone 2 may have three or more two-dimensional boundary line-segments or four or more three-dimensional boundary surfaces. A device 104 following a trajectory 130 may generate a first interrupt 132 when entering the hot zone 2 and a second interrupt 134 when leaving the hot zone 2.

A third hot zone (e.g., hot zone 3) may be defined as a volume in space. The boundaries of the hot zone 3 may be the surfaces of the volume. A device 104 following a trajectory 140 may generate a first interrupt 142 when entering the hot zone 3 and a second interrupt 144 when leaving the hot zone 3.

The hot zones (e.g., hot zone 3) may include definitions of one or more sections along the perimeter and/or one or more regions on the surface of the hot zone where a boundary crossing is either valid or invalid. For example, a top side 146 of the hot zone 3 may be marked as an invalid crossing region and the remaining sides 148 of the hot zone 3 may be marked as valid crossing regions. One or more vertical sides and/or one or more overhead surfaces may define obstructions.

The module 121 may use the hot zone definitions received in the signal HOT ZONES to generate the signal VIEW. The signal VIEW may provide detailed information about obstructions to the sky as seen by the device 104. The circuit 108 may account for the obstructions when determining the best group of satellites 102a-102n to use in calculating an updated device position. For example, when the signal VIEW indicates that a particular satellite is obstructed, the circuit 120 may dismiss the particular satellite from consideration involving position and time updates.

Figure 10:
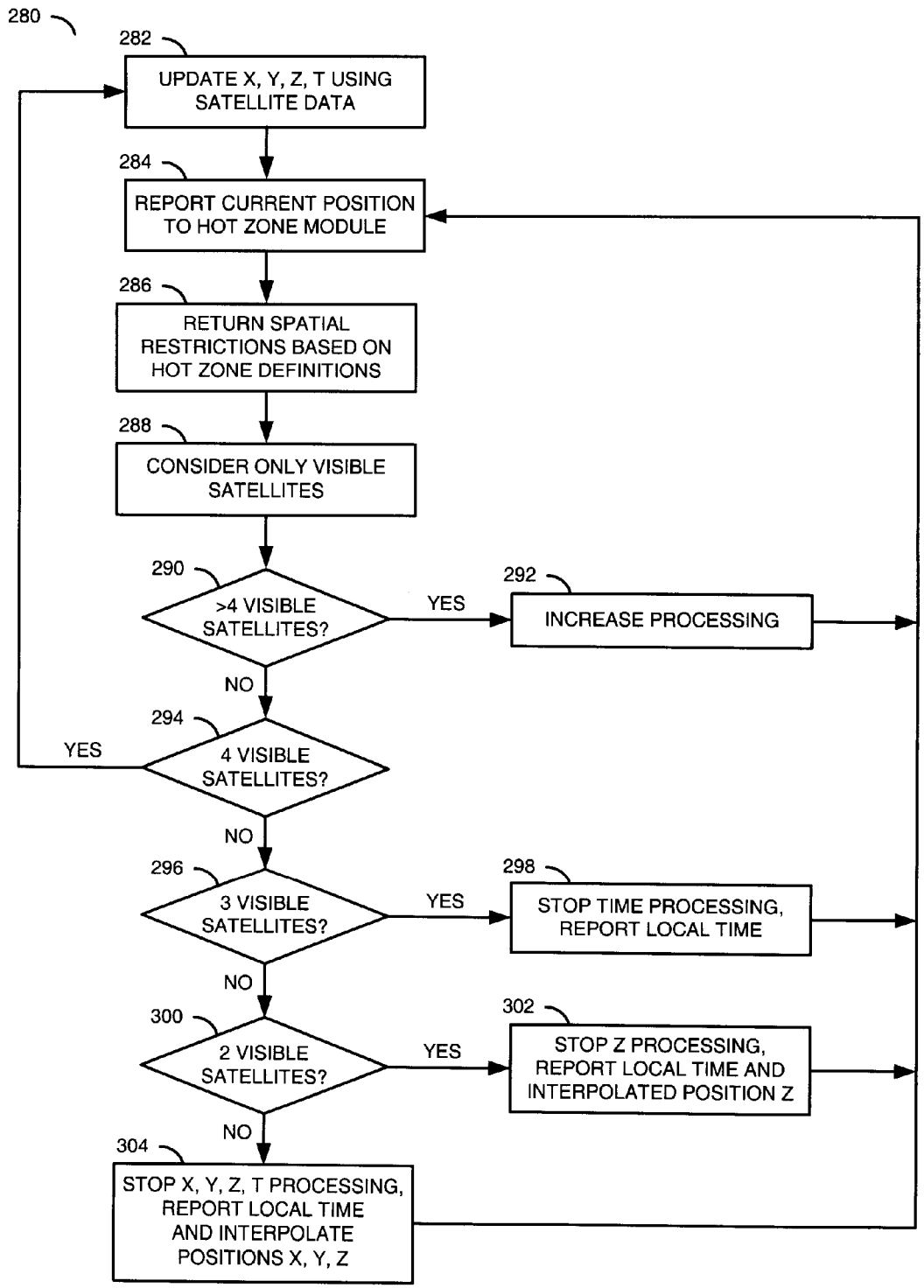
FIG. 10 is a flow diagram of an example method of utilizing the hot zones.

Referring to FIG. 10, a flow diagram of an example method 280 of utilizing the hot zones is shown. The method (or process) 280 may be suitable in an urban (or natural) canyon environment where visibility of the satellites 102a-102n may be limited as a function of time due to a restricted view of the sky. The method 280 generally comprises a step (or block) 282, a step (or block) 284, a step (or block) 286, a step (or block) 288, a step (or block) 290, a step (or block) 292, a step (or block) 294, a step (or block) 296, a step (or block) 298, a step (or block) 300, a step (or block) 302 and a step (or block) 304.

The circuit 108 may process the available satellite data in the step 282 to calculate an updated position {x,y,z} and an update time t (from the updated time bias). The updated position {x,y,z} may be provided to the module 121 via the signal OUT in the step 284. The module 121 may compare the updated position {x,y,z} to one or more definitions of hot zone 109a-109k in the step 286 and return spatial restrictions to the circuit 108 in the signal VIEW. When the circuit 108 measures the next set of the pseudoranges, the circuit 120 may consider the spatial restrictions to avoid wasting processing resources looking for signals Sa-Sn hidden behind a building or mountain side in the step 288. Furthermore in the step 288, the circuit 122 may consider only the visible satellites 102a-102n as indicated by the spatial restrictions when determining which of the pseudorange signals may be used in calculating the next position and the next time bias.

If more than four satellites are available (e.g., the YES branch of step 290), the processing capability of the circuit 120 and/or the circuit 122 may be increased in the step 292 to consider the greater number of pseudoranges in calculating the next position and the next time bias. The temporary increase in processing capability (and thus in power consumed) may pay for an immediate increase in the accuracy of the one or more measurements/calculations while the greater number of satellites 102a-102n are available. If no more than four satellites are visible (e.g., the NO branch of step 290), the method 280 may continue with the step 294.

If four satellites are available (e.g., the YES branch of step 294), the circuit 108 may process the four signals Sa-Sn to update the position and the time bias in the step 282 as normal. If only three satellites are available (e.g., the NO branch of step 294 and the YES branch of step 296), the circuit 122 may stop updating the time bias in the step 298 and report the local time as determined by the circuit 124, now in a free running mode. The circuit 122 may also update the current position in the step 298 using the three available pseudorange signals and the local time. The resulting position and local time may be reported to the circuit 121 in the step 284.

If two satellites are visible (e.g., the NO branch of step 296 and the YES branch of step 300), the circuit 122 may stop processing the position variable z in the step 302. Instead, the circuit 122 may process only the position variables x and y in the step 302 using the two pseudorange signals, the last known value of variable z and the local time t. The resulting position and time information may then be reported to the circuit 121 per the step 284.

If no satellites or only a one satellite is visible (e.g., the NO branch of step 304), the circuit 122 may stop processing the pseudoranges, calculate an interpolated position {x,y,z} and report the interpolated position and the local time t in the step 304. The interpolated position information and the local time are generally sent to the circuit 121 per the step 284. In some embodiments, if a single pseudorange is available from the circuit 120, the circuit 122 may calculate the time bias in the step 304 and update the local time in the circuit 124. The interpolated position and the updated local time may then be presented to the circuit 121.

As the device 104 moves through a canyon, the spatial restrictions may change. As time progresses, additional satellites 102a-102n may come into view outside the spatial restrictions. With more satellites available, the circuit 108 may increase the processing capability accordingly to process the additional data.

The functions performed by the diagrams of FIGS. 1-10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of RFICs, ASICs, FPGAs or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method to reduce power consumption in a device, comprising the steps of:
   (A) generating in said device a plurality of pseudorange signals by tracking a plurality of position signals received from a plurality of satellites in a positioning system, at least one of said position signals from each one of said satellites respectively;
   (B) calculating in said device both an initial position and an initial time bias from said pseudorange signals using a processing capability of said device at a normal capacity; and
   (C) calculating in said device both an updated position and an updated time bias using said processing capability reduced to a first capacity, wherein said first capacity (i) consumes less power than said normal capacity and (ii) is suitable to process said updated position and said updated time bias using a limited number comprising less than all of said pseudorange signals being tracked.

2. The method according to claim 1, wherein said limited number comprises at most four of said pseudorange signals.

3. The method according to claim 1, further comprising the step of:
   determining that a drift rate of a local time kept by said device is less than a threshold.

4. The method according to claim 3, wherein step (C) comprises the sub-step of:
   calculating said updated position using said processing capability reduced to a second capacity if said drift rate is less than said threshold, wherein said second capacity (i) consumes less power than said first capacity and (ii) is suitable to process said updated position using all of (a) said local time and (b) at most three of said pseudorange signals.

5. The method according to claim 4, further comprising the steps of:
determining that said local time is invalid; and
increasing said processing capability to said first capacity if said local time is invalid such that said updated time bias is calculated from at least four of said pseudorange signals.

6. The method according to claim 1, further comprising the step of:
detecting that a change rate of a particular variable of a current position of said device is negligible, said particular variable comprising one of (i) an X position of said device, (ii) a Y position of said device and (iii) a Z position of said device.

7. The method according to claim 6, wherein step (C) comprises the sub-step of:
calculating two other variables within said updated position using said processing capability reduced to a second capacity, wherein said second capacity (i) consumes less power than said first capacity and (ii) is suitable to process said updated time bias and said two other variable using all of (a) said particular variable and (b) at most three of said pseudorange signals.

8. The method according to claim 1, further comprising the steps of:
identifying a subset of said pseudorange signals that produces a best figure of merit; and
limiting said calculation of said updated time bias and said updated position to said pseudorange signals in said subset.

9. The method according to claim 8, wherein said best figure of merit comprises at least one of (i) a smallest dilution of precision and (ii) a strongest received power of said position signals.

10. The method according to claim 8, further comprising the step of:
storing spatial restriction information in said device, said spatial restriction information corresponding to a particular position in said positioning system.

11. The method according to claim 10, further comprising the step of:
determining that at least one of said position signals previously obstructed is currently visible to said device according to said spatial restriction information in response to said updated position approximately matching said particular position.

12. The method according to claim 11, further comprising the step of:
locking on to said at least one position signal before said identification of said subset.

13. The method according to claim 1, further comprising the step of:
reducing said processing capability to a second capacity in response to receiving at most two of said position signals, wherein said second capacity (i) consumes less power than said first capacity and (ii) is suitable for processing two variables of said updated position using all of (a) a local time, (b) a last known value of a third variable of said updated position and (c) said at most two of said pseudorange signals.

14. The method according to claim 1, further comprising the step of:
reducing said processing capability to a second capacity in response to receiving at most one of said position signals, wherein said second capacity (i) consumes less power than said first capacity and (ii) is suitable for processing one among three variables of said updated position and said updated time bias using said at most one of said pseudorange signals.

15. A device comprising:
a tracking engine configured to generate a plurality of pseudorange signals by tracking a plurality of position signals received from a plurality of satellites in a positioning system, at least one of said position signals from each one of said satellites respectively; and
a position calculator configured to (i) calculate both an initial position and an initial time bias from said pseudorange signals using a processing capability of said device at a normal capacity and (ii) calculate both an updated position and an updated time bias using said processing capability reduced to a first capacity, wherein said first capacity (a) consumes less power than said normal capacity and (b) is suitable to process said updated position and said update time bias using a limited number comprising less than all of said pseudorange signals being tracked.

16. The device according to claim 15, wherein said tracking engine is further configured to track a greater number of said position signals than said limited number of said pseudorange signals.

17. The device according to claim 15, wherein said position calculator is further configured to reduce said processing capability to a second capacity, wherein said second capacity (i) consumes less power than said first capacity and (ii) is suitable to process said updated position using at most three of said pseudorange signals.

18. The device according to claim 15, wherein power is removed from at least one hardware module to reduce said processing capability.

19. The device according to claim 15, wherein execution of a first software module is stopped and execution of a second software module is started to reduce said processing capability.

20. The device according to claim 15, further comprising a zone module configured to store spatial restriction information, said spatial restriction information corresponding to a particular position in said positioning system.

21. A device comprising:
means for generating a plurality of pseudorange signals by tracking a plurality of position signals received from a plurality of satellites in a positioning system, at least one of said position signals from each one of said satellites respectively; and
means for (i) calculating both an initial position and an initial time bias from said pseudorange signals using a processing capability of said device at a normal capacity and (ii) calculating both an updated position and an updated time bias using said processing capability reduced to a first capacity, wherein said first capacity (a) consumes less power than said normal capacity and (b) is suitable to process said updated position and said updated time bias using a limited number comprising less than all of said pseudorange signals being tracked.

22. The method according to claim 1, further comprising the step of:
reducing a tracking capability from an initial capacity prior to said calculating of said initial position and said initial time bias to a reduced capacity afterwards, wherein said device tracks at most six of said pseudorange signals while in said reduced capacity.

23. The device according to claim 15, wherein said tracking engine is further configured to reduce a tracking capability from an initial capacity prior to said calculation of said initial position and said initial time bias to a reduced capacity afterwards, wherein said tracking engine tracks at most six of said pseudorange signals while in said reduced capacity.

* * * * *